United States Patent [19]

Bednarczyk

[11] Patent Number: 4,476,391

[45] Date of Patent: Oct. 9, 1984

[54] METHOD FOR IMPROVING ACCURACY IN A NEUTRON DETECTOR

[75] Inventor: Adam Bednarczyk, Carrollton, Tex.

[73] Assignee: Mobil Oil Corporation, New York, N.Y.

[21] Appl. No.: 355,435

[22] Filed: Mar. 8, 1982

[51] Int. Cl.³ .............................................. G01T 3/00
[52] U.S. Cl. .................................... 250/390; 250/392
[58] Field of Search ................... 250/390, 252.1, 391, 250/392, 393, 374, 375

[56] References Cited

U.S. PATENT DOCUMENTS 4,002,904  1/1977  Smith, Jr. et al. ................. 250/270

OTHER PUBLICATIONS

Bluhm, H., "A γ-Discriminating ³He-Semiconductor Sandwich Spectrometer", *Nuclear Instruments and Methods*, vol. 115, No. 2, (Mar. 1, 1974), pp. 325-337, esp. pp. 328-329.

Jackson, H. E., and Thomas, G. E., "Boron-Loaded Neutron Detector with Very Low γ-Ray Sensitivity", *The Review of Scientific Instruments*, vol. 36, No. 4, (Apr. 1965), pp. 419-425, esp. 423-424.

*Primary Examiner*—Janice A. Howell
*Assistant Examiner*—Constantine Hannaher
*Attorney, Agent, or Firm*—A. J. McKillop; M. G. Gilman; F. J. Kowalski

[57] ABSTRACT

A method for improving the accuracy of neutron detectors is disclosed wherein a predetermined threshold level, by analysis of a neutron and gamma relative distribution curve, is set and all amplitudes below this predetermined minimum are removed from a neutron detector total count.

3 Claims, 3 Drawing Figures

METHOD FOR IMPROVING ACCURACY IN A NEUTRON DETECTOR

BACKGROUND OF THE INVENTION

Uranium prospecting may be done by drilling a well similar to that drilled in oil exploration. Modern technology has led to many methods for obtaining radioactive material from the well once it is located.

A common technique for locating the level at which radioactive material is present is to "log" the well or measure neutrons emitted by the formations surrounding the wellbore. This is accomplished by lowering a logging tool such as a neutron detector down to the bottom of the well. The tool may then be pulled up the well while measurements are taken of the radioactivity which gives an indication of the lithology. In certain applications, a neutron source is included in the logging tool to inject neutrons into the formations. The injected neutrons will cause any radioactive material present to emit secondary neutrons. When secondary neutrons are detected, radioactive material is located. Unfortunately, the burst of neutrons injected into the formation causes the generation of gamma-rays greatly in excess of the secondary neutrons.

Traditionally, a neutron detector is used such as that illustrated in FIG. 1 to obtain a count of neutrons present. Neutron detector 12 generally consists of a metal cylinder 14 which contains a detector gas 16, typically 3He. A metal rod 18 is located in the center of cylinder 14 and connected to the anode of a DC power supply 20 through resistor 21. The cathode of power supply 20 is connected to metal cylinder 14.

In operation, neutrons 22 penetrate metal cylinder 14 and collide with 3He gas molecules within. An electron 24 is readily given up by the force of the collision. The freed electrons 24 are attracted to the positively charged rod 18. The presence of electrons is measured as an increased current flow measured at node 26 through capacitor 28. Each electron causes a change in amplitude of the current measured.

Unfortunately, the amplitude change is not exactly the same for each electron and it has been discovered that high speed gamma-rays can free electrons 24 from cylinder 14. Electrons freed by high speed gamma-rays may occasionally cause an amplitude change approximately equal to that caused by neutron collisions. With the highly sensitive neutron detections of modern technology, an inaccurate neutron count will result.

SUMMARY OF THE INVENTION

The present invention pertains to mineral logging tools and more particularly to uranium logging tools of the neutron detector type having a high degree of sensitivity. The present invention provides a method for removing the inaccuracies generated in a neutron detector by high energy gamma-rays. A distribution curve of detector amplitudes resulting from gamma-rays is plotted. A similar distribution curve of detector amplitudes resulting from neutrons is also plotted. A predetermined cutoff point is set. All amplitudes lower than the predetermined cutoff point are attributed to gamma generation and all amplitudes greater than the predetermined maximum are attributed to neutron generation.

DESCRIPTION OF THE PREFERRED EMBODIMENT

Figure 1:
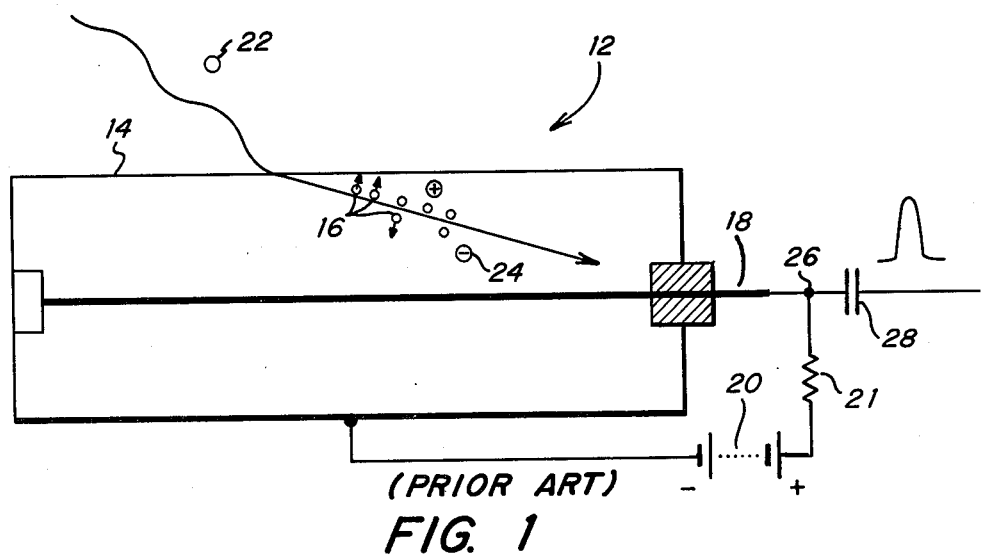
FIG. 1 is a partial block diagram of a prior art neutron detector.

In present day uranium prospecting, a well is drilled similar to that drilled for oil production. A logging tool with a neutron detector is lowered in the well and then pulled to the surfce while taking measurement of neutron density.

As previously described, operation neutrons 22 penetrate metal cylinder 14 and collide with helium gas contained within metal cylinder 14. An electron 24 is readily given up by the force of the collision. Freed electron 24 is attracted to positively charged rod 18. The presence of electrons is measured as an increased current flow at node 26 through capacitor 28. Each electron causes a change in amplitude of the current measured.

As the sensitivity of neutron detector 12 is increased, additional electron counts are generated by gamma-ray radiation incident upon neutron detector 12. Gamma rays interact with the metal housing, metal cylinder 14, to increase the current flow through the circuit which includes positively charged rod 18. The occurrence of incident gamma radiation effectively increases the neutron count produced by neutron detector 12 measured at node 26. In many instances, the neutron count was believed to be higher than was actually present. Apparatus for neutron detection which is sensitive to incident neutrons but not gamma radiation has been developed for certain applications. This type of detector utilizes a plastic housing or cylinder in place of metal cylinder 14. However, this type of housing is not suitable for use with extreme temperatures and pressures such as that encountered in deep substrate wells.

Figure 2:
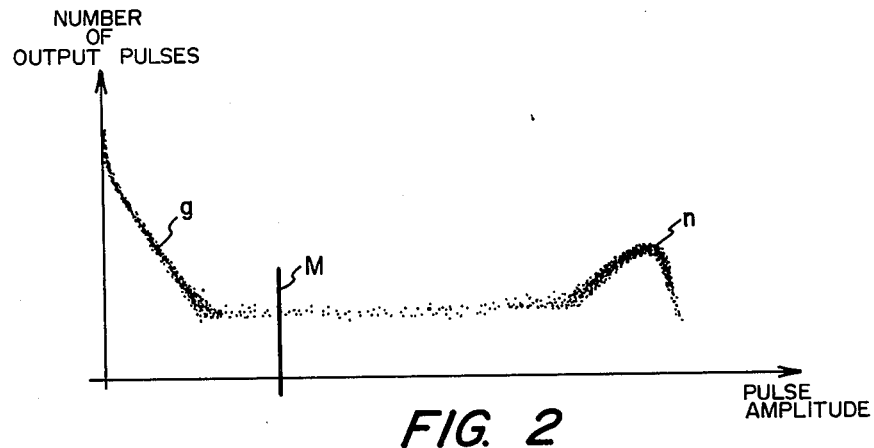
FIG. 2 is a graphical representation of a neutron detector output.

Referring now to FIG. 2, a graphical representation of the output of a neutron detector such as neutron detector 12 is illustrated having increasing amplitude or energy level plotted on its x axis and a count plotted on the y axis for corresponding amplitudes. Count points of lower amplitudes are marked g indicating that they are due primarily to gamma radiation. Count points having higher amplitudes are marked n indicating that they are due primarily to neutron generation of freed electrons. A vertical line M illustrates a predetermined threshold level which has been set to segregate count points due to gamma radiation and count points due to neutron generation.

The distribution count points due to gamma radiation may be obtained by determining the theoretical amplitudes of the gamma-ray interaction with metal cylinder 14 (infra) and providing a statistical distribution display of the theoretical amplitudes. Also the distribution count points may be obtained by measuring the actual gamma radiation by putting a gamma-ray source next to the neutron detector. The output of the neutron detector will be due entirely to gamma radiation and the distribution of amplitude levels may be obtained.

Figure 3:
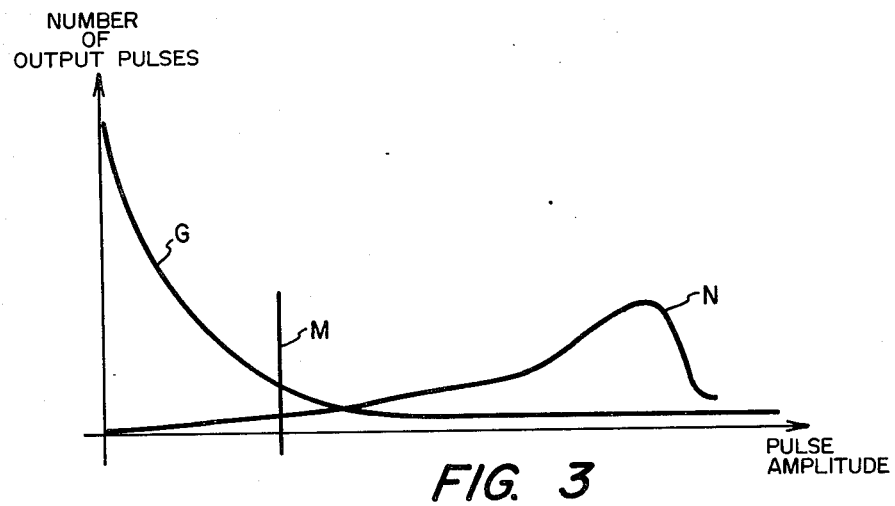
FIG. 3 is a graphical representation of the curves of FIG. 2.

Referring now to FIG. 3, the smooth curves which approximate the distribution of the count points of FIG. 2 are illustrated. The curve labeled G is an approximate distribution of the count points caused by the interaction of metal cylinder 14 with gamma radiation. The curve marked N is an approximate distribution of the count points of electrons freed by neutron radiation. Vertical line M is again used to set the threshold level which divides the counter points attributed to gamma-ray interaction and the count points attributed to neutron generation.

The neutron distribution curve N illustrated in FIG. 3 was obtained for explanation. The output of neutron detector 12 was plotted and the portion of the output attributed to gamma-ray interaction as determined by curve G was subtracted to provide a representation of actual neutron activity.

As illustrated, curve G overlaps curve N. Any predetermined threshold level which is set, does not count electrons freed by neutrons that have an amplitude lower than threshold level M. Furthermore, additional counts appear due to the interaction of metal cylinder 14 and gamma-rays. Thus, a predetermined threshold level is set which permits the counting of a maximum number of electrons freed by neutrons while minimizing the count of electrons freed by gamma-rays.

Apparatus for setting the predetermined threshold level may be any type currently known in the art. A microprocessor may be used alone or in conjunction with an electronic biasing circuit to segregate all counts having amplitudes above or below the predetermined minimum.

The present invention has been described in conjunction with a neutron detector having helium as the detector gas contained within a metal cylinder having a metal detector plate at one end. However, the method of the present invention may be used in conjunction with other neutron detectors which, because of their high sensitivity, are subject to inaccuracies caused by gamma-ray radiation. While the present invention has been described by way of preferred embodiment, it is to be understood that it is not to be limited thereto but only by the scope of the following claims.

I claim:

1. A method for improving the accuracy of a neutron detector comprising the steps of:
    plotting a distribution by amplitude of gamma-ray interaction with said neutron detector by determining a theoretical amplitude of said gamma-ray interaction and providing a statistical distribution display of said theoretical amplitudes;
    plotting a distribution by amplitude of neutron output of said neutron detector;
    setting a threshold amplitude level for said neutron output distribution; and
    attributing all distribution points below said threshold amplitude level to said gamma-ray interaction.

2. The method according to claim 1 wherein said step of plotting a distribution of gamma-ray interaction includes the step of:
    measuring actual gamma-ray interaction with said neutron detector.

3. The method according to claim 2 wherein said measuring step includes the steps of:
    putting a gamma-ray source next to said neutron detector; and
    determining amplitudes of the radiation from said gamma-ray source.

* * * * *